United States Patent [19]
Tanioka et al.

[11] Patent Number: 5,153,925
[45] Date of Patent: Oct. 6, 1992

[54] IMAGE PROCESSING APPARATUS

[75] Inventors: Hiroshi Tanioka; Yasuhiro Yamada, both of Yokohama, Japan

[73] Assignee: Canon Kabushiki Kaisha, Tokyo, Japan

[21] Appl. No.: 515,222

[22] Filed: Apr. 27, 1990

[30] Foreign Application Priority Data

Apr. 27, 1989 [JP] Japan .................. 1-105878
Dec. 14, 1989 [JP] Japan .................. 1-322684

[51] Int. Cl.$^5$ .............................. G06K 9/38
[52] U.S. Cl. ......................... 382/52; 382/50; 358/466; 358/462
[58] Field of Search .............. 382/50, 52; 358/455, 358/462, 464, 466

[56] References Cited

U.S. PATENT DOCUMENTS

| | | | |
|---|---|---|---|
| 4,194,221 | 3/1980 | Stoffel | 358/456 |
| 4,251,837 | 2/1981 | Janeway, III | 382/50 |
| 4,447,830 | 5/1984 | Stoffel | 358/462 |
| 4,468,704 | 8/1984 | Stoffel et al. | 382/52 |
| 4,554,593 | 11/1985 | Fox et al. | 382/50 |
| 4,577,235 | 3/1986 | Kannapell et al. | 382/52 |
| 4,668,995 | 5/1987 | Chen et al. | 358/462 |
| 4,686,579 | 8/1987 | Sakamoto | 358/462 |
| 4,729,035 | 3/1988 | Tanioka | 358/282 |
| 4,821,334 | 4/1989 | Ogino et al. | 382/50 |

FOREIGN PATENT DOCUMENTS 57-104369 6/1982 Japan .

Primary Examiner—Leo H. Boudreau
Assistant Examiner—David Fox
Attorney, Agent, or Firm—Fitzpatrick, Cella, Harper & Scinto

[57] ABSTRACT

An image processing apparatus comprises: first binarizing means for binarizing input image data by an average value based on the binarized data of pixels near an objective pixel which has already been binarized; second binarizing means for binarizing the input image data by a predetermined threshold vlaue; and selecting means for selecting either one of the first and second binarizing means in accordance with whether the input image data indicates an edge portion or not, whereby by selecting either a binarizing process by the average density preservation method or a binarizing process by a fixed threshold value in accordance with the presence or absence of an edge of input data, an image of a high grade can be reproduced for either a half tone image or a character image.

3 Claims, 12 Drawing Sheets

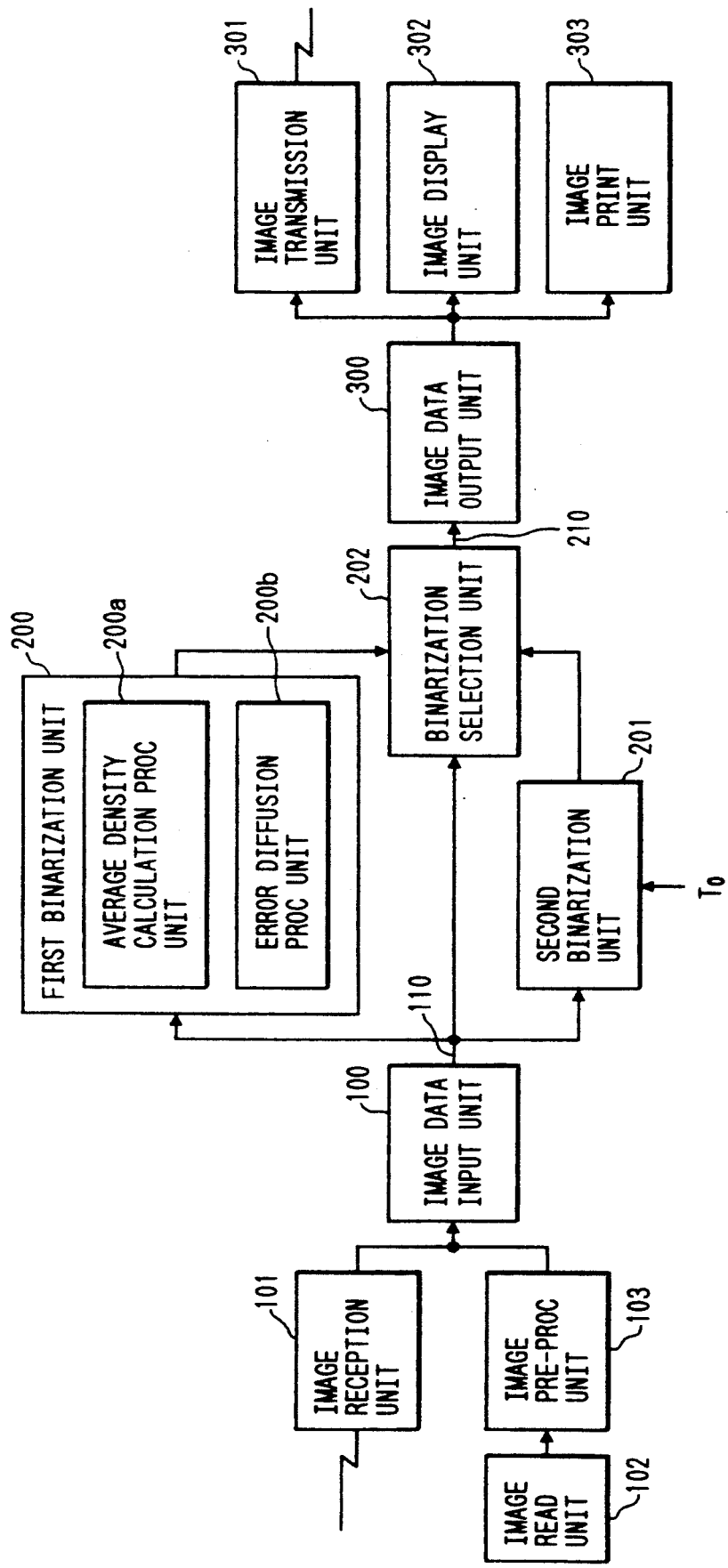

FIG. 2A

| f(i-2, j-2) | f(i-1, j-2) | f(i, j-2) | f(i+1, j-2) | f(i+2, j-2) |
|---|---|---|---|---|
| f(i-2, j-1) | f(i-1, j-1) | f(i, j-1) | f(i+1, j-1) | f(i+2, j-1) |
| f(i-2, j) | f(i-1, j) | f(i, j) | f(i+1, j) | f(i+2, j) |

FIG. 2B

| B(i-2, j-2) | B(i-1, j-2) | B(i, j-2) | B(i+1, j-2) | B(i+2, j-2) |
|---|---|---|---|---|
| B(i-2, j-1) | B(i-1, j-1) | B(i, j-1) | B(i+1, j-1) | B(i+2, j-1) |
| B(i-2, j) | B(i-1, j) | B(i, j) | B(i+1, j) | B(i+2, j) |

FIG. 2C

| R(-2,-2) | R(-1,-2) | R(0,-2) | R(1,-2) | R(2,-2) |
|---|---|---|---|---|
| R(-2,-1) | R(-1,-1) | R(0,-1) | R(1,-1) | R(2,-1) |
| R(-2,0) | R(-1,0) | R(0,0) | R(1,0) | R(2,0) |

| 2/48 | 3/48 | 4/48 | 3/48 | 2/48 |
|---|---|---|---|---|
| 3/48 | 4/48 | 5/48 | 4/48 | 3/48 |
| 4/48 | 5/48 | 6/48 | | |

FIG. 4A

| * | 0 | 1 | 1 | 1 |
|---|---|---|---|---|
| * | 0 | 1 | 1 | 1 |
| * | * | | | |

FIG. 4B

| 1 | 1 | 1 | 0 | * |
|---|---|---|---|---|
| 1 | 1 | 1 | 0 | * |
| * | * | | | |

FIG. 4C

| * | 1 | 1 | 1 | 0 |
|---|---|---|---|---|
| * | 1 | 1 | 1 | 0 |
| * | * | | | |

FIG. 4D

| 1 | 1 | 0 | * | * |
|---|---|---|---|---|
| 1 | 1 | 0 | * | * |
| 1 | 1 | | | |

FIG. 4E

| * | 1 | 0 | 0 | 0 |
|---|---|---|---|---|
| * | 1 | 0 | 0 | 0 |
| * | * | | | |

FIG. 4F

| 0 | 0 | 0 | 1 | * |
|---|---|---|---|---|
| 0 | 0 | 0 | 1 | * |
| * | * | | | |

FIG. 4G

| * | 0 | 0 | 0 | 1 |
|---|---|---|---|---|
| * | 0 | 0 | 0 | 1 |
| * | * | | | |

FIG. 4H

| 0 | 0 | 1 | * | * |
|---|---|---|---|---|
| 0 | 0 | 1 | * | * |
| 0 | 0 | | | |

FIG. 5A

| a | b | c | d | e |
|---|---|---|---|---|
| f | g | h | i | j |
| k | l | | | |

FIG. 5B

| 0 | 1 | 0 | 1 | 0 |
|---|---|---|---|---|
| 1 | 0 | 0 | 1 | 0 |
| 0 | 1 | | | |

FIG. 5C

| 0 | 0 | 1 | 1 | 1 |
|---|---|---|---|---|
| 1 | 0 | 1 | 1 | 1 |
| 0 | 1 | | | |

FIG. 5D

| 0 | 0 | 1 | 1 | 1 |
|---|---|---|---|---|
| 0 | 1 | 2 | 1 | 1 |
| 0 | 0 | | | |

FIG. 5E

| 1 | 2 | 2 | 3 | 2 |
|---|---|---|---|---|
| 0 | 1 | 2 | 3 | 2 |
| 0 | 0 | | | |

FIG. 7A

| f(i-2, j-2) | f(i-1, j-2) | f(i, j-2) | f(i+1, j-2) | f(i+2, j-2) |
| --- | --- | --- | --- | --- |
| f(i-2, j-1) | f(i-1, j-1) | f(i, j-1) | f(i+1, j-1) | f(i+2, j-1) |
| f(i-2, j) | f(i-1, j) | f(i, j) | f(i+1, j) | f(i+2, j) |

FIG. 7B

| B(i-2, j-2) | B(i-1, j-2) | B(i, j-2) | B(i+1, j-2) | B(i+2, j-2) |
| --- | --- | --- | --- | --- |
| B(i-2, j-1) | B(i-1, j-1) | B(i, j-2) | B(i+1, j-1) | B(i+2, j-1) |
| B(i-2, j) | B(i-1, j) | B(i, j) | | |

FIG. 7C

| R(-2, -2) | R(-1, -2) | R(0, -2) | R(+1, -2) | R(+2, -2) |
| --- | --- | --- | --- | --- |
| R(-2, -1) | R(-1, -1) | R(0, -1) | R(+1, -1) | R(+2, -1) |
| R(-2, 0) | R(-1, 0) | R(0, 0) | R(+1, 0) | R(+2, 0) |

| 21 | 21 | 21 | 21 | 21 |
|----|----|----|----|----|
| 21 | 22 | 22 | 22 | 21 |
| 21 | 21 |    |    |    |

FIG. 11A

| 27 | 23 | 21 | 23 | 27 |
|----|----|----|----|----|
| 23 | 18 | 16 | 18 | 23 |
| 21 | 15 |    |    |    |

FIG. 11B

| 32 | 32 | 31 | 32 | 32 |
|----|----|----|----|----|
| 32 | 0  | 0  | 0  | 32 |
| 32 | 0  |    |    |    |

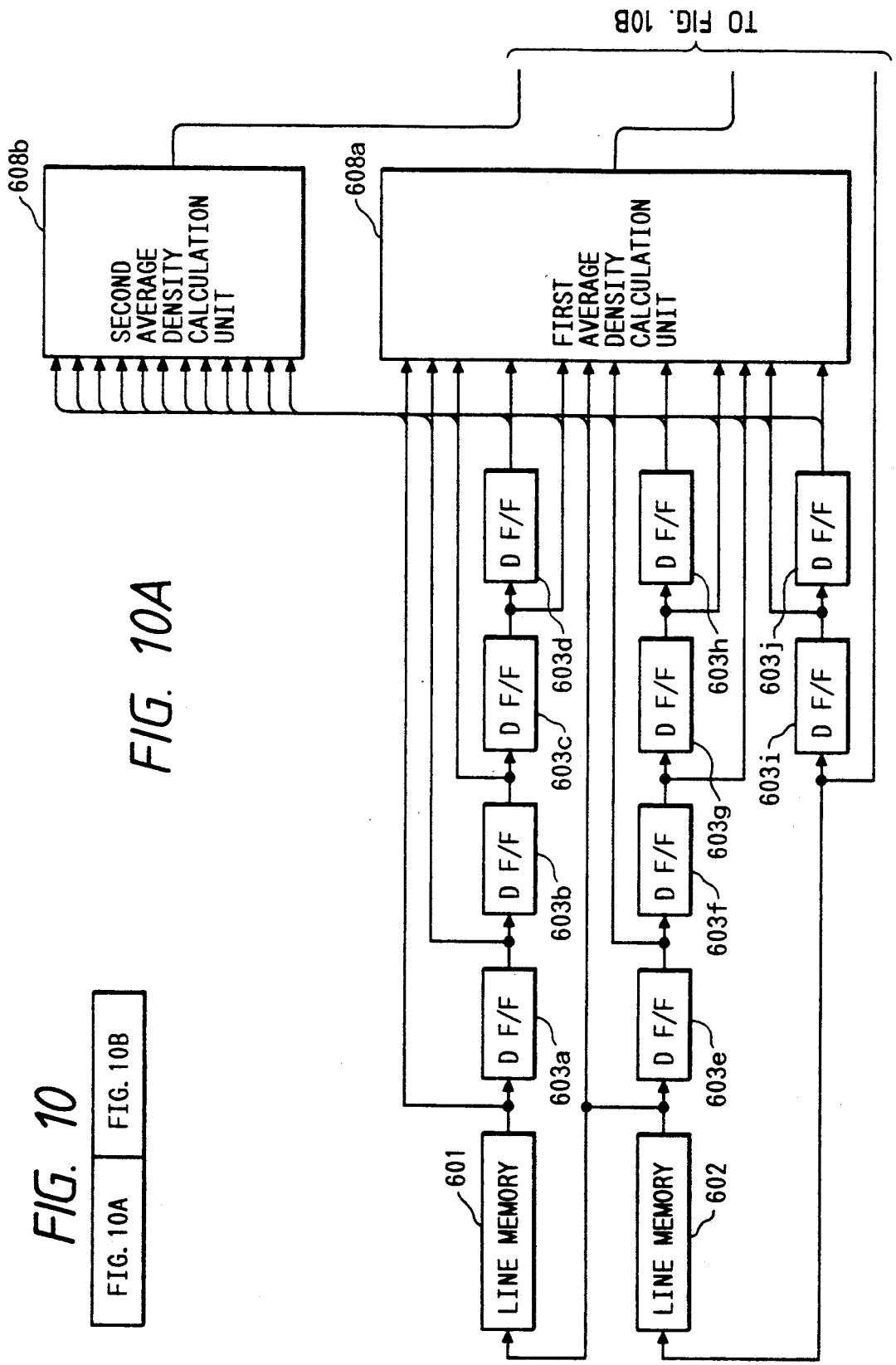

IMAGE PROCESSING APPARATUS

FIELD OF THE INVENTION

The present invention relates to an image processing apparatus of a facsimile apparatus, a digital copying apparatus, or the like and, more particularly, to an image processing apparatus in which input image data obtained by reading an image of an original is digitized into a reproduction signal by a pseudo-halftone process.

RELATED BACKGROUND ART

Hitherto, as such a kind of pseudo-halftone processing method, ① an error diffusion method and ② an average density approximation method (Japanese Unexamined Patent Publication (Kokai) No. 57-104369) have been known.

The former is a binarizing method whereby multivalue pixel data of an object pixel is binarized using a predetermined threshold value and the errors between the binarized level and the multivalue pixel data of the object pixel are distributed to pixels near the object pixel by a predetermined distribution ratio and added. The latter is a method whereby the binarized data of pixels near the object pixel are used, the object pixel is binarized into black or white, weighted near-average values of both of the object pixel and the pixel near it are obtained, and an average value which is close to the object pixel level between the average values is selected, thereby binarizing the object pixel.

The former without involving a two-dimensional calculation for the multivalue data and has the drawback that the apparatus cannot be cheaply constructed by hardware due to the large amount of data processing required. According to the latter method, a texture of a low frequency which is peculiar to such a system is generated for an image having gentle density changes and the number of gradation levels which can substantially reproduced is extremely inferior to that of the former method.

Therefore, there is considered a novel binarizing method called an average density preservation method whereby a single average density is obtained and an image is binarized using the single average density value as a threshold value and a correcting process for writing binarization errors is added. With respect to the average density preservation method, the applicant of the present invention has already filed a new U.S. patent application, Ser. No. 07/476,766, on Feb. 8, 1990, on the basis of priority of Japanese Patent Applications Nos. 1-31404, 1-31405, 1-31408, and 1-31409 (all of were filed in Japan on Feb. 10, 1989) and a new U.S. patent application Ser. No. 07/476,618, filed on Feb. 7, 1990, on the basis of priority of Japanese Patent Application No. 1-31411 (filed in Japan on Feb. 10, 1989) and Japanese Patent Application No. 1-284879 (filed in Japan on Nov. 2, 1989).

However, when the density preservation type binarizing method is used, there is the drawback that halftone characters are made fine and become slightly blurred or dim, so that they cannot be clearly binarized.

On the other hand, there is also the drawback that notches of a size comparable to a pixel are generated in the edge portion of a character, a diagram, or the like, so that it is impossible to clearly binarize.

SUMMARY OF THE INVENTION

It is an object of the present invention to provide an image processing apparatus in which the above drawbacks can be eliminated the amount of processing data required is small and a binary image of a high grade can be reproduced by a simple construction.

Another object of the invention is to provide an image processing apparatus in which by selecting either a binarizing process using the average density preservation method or a binarizing process using a fixed threshold value in accordance with the presence or absence of an edge in the input data, an image of a high grade can be reproduced for either a halftone image or a character image.

To accomplish the above object, an image processing apparatus according to the present invention comprises: first binarizing means for binarizing input image data by an average value based on the binarized data of pixels near an object pixel which has already been binarized; second binarizing means for binarizing the input image data by a predetermined threshold value; and selecting means for selecting one of the first and second binarizing means in accordance with whether the input image data indicates an edge portion or not.

Still another object of the invention is to provide an image processing apparatus in which a binarizing process using the average density approximation method is changed in accordance with an edge amount.

Still another object of the invention is to provide an image processing apparatus for binarizing multivalue image data using the average value based on the binarized data in a predetermined range which has already been binarized, wherein the apparatus comprises: average density calculating means for calculating an average density by at least two different weighting masks; edge amount calculating means for obtaining an edge amount from input image data; and mixing means for mixing a plurality of average values calculated by the different weighting masks in correspondence to the edge amount.

The above and other objects and features of the present invention will become apparent from the following detailed description of the preferred embodiments with reference to the accompanying drawings.

BRIEF DESCRIPTION OF THE DRAWINGS

FIG. 1A is a block diagram showing a construction of an image processing apparatus of the first embodiment;

FIGS. 2A to 2C are diagrams for explaining the processing principle of the image processing apparatus of the first embodiment;

FIG. 3 is a diagram showing masks which are used in the first embodiment;

FIGS. 4A to 4H are diagrams showing matrices which are used in the discrimination of an edge portion in the first embodiment;

FIGS. 5A to 5E are diagrams showing other embodiments for the discrimination of an edge portion;

FIGS. 7A to 7C and 8 are diagrams for explaining an average density preservation method;

FIG. 9 is a diagram showing an example of weighting masks which are used in a second average density calculation unit of the second embodiment;

FIGS. 10A and 10B are diagrams showing a hardware construction of a binarization processing unit of the second embodiment; and FIGS. 11A and 11B are diagrams showing other examples of weighting masks which are used in the second average density calculation unit.

DETAILED DESCRIPTION OF THE PREFERRED EMBODIMENTS

First embodiment

Figure 1B:
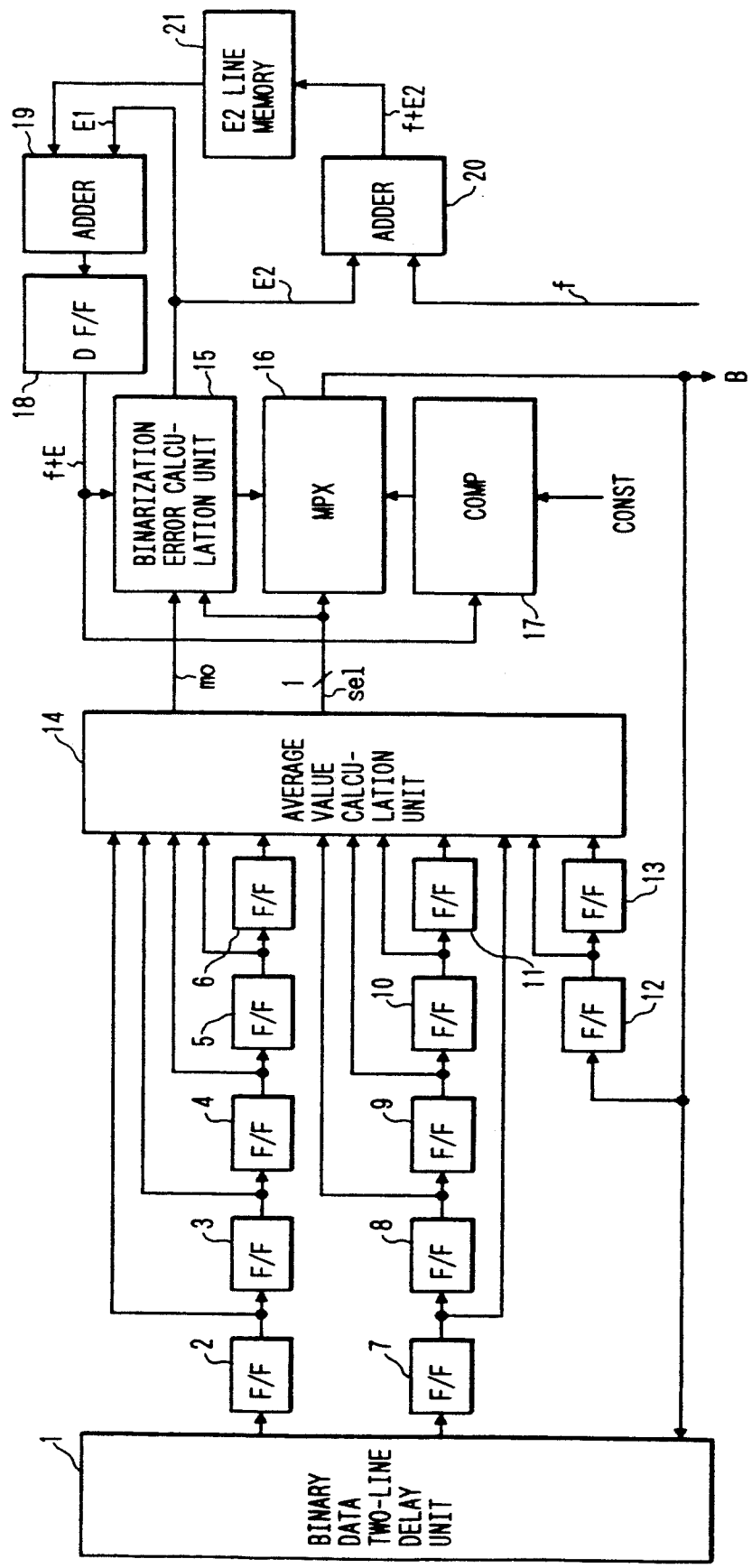
FIG. 1B is a block diagram showing a detailed construction of a binarizing section of the first embodiment.

FIG. 1A is a block constructional diagram of an image processing apparatus of the first embodiment.

In the diagram, reference numeral 10 denotes an image data input unit. An image of an original is read by an image reception unit 101 or an image read unit 102 and digitized. The digital signal is subjected to a shading correction or the like by an image pre-processing unit 103. Thus, multivalue data 110 is output from the image data input unit 100. Reference numeral 200 denotes a first binarization unit comprising an average density calculation processing unit 200a and an error diffusion processing unit 200b as an integrated form. Reference numeral 201 denotes a second binarization unit to execute the binarization by a predetermined threshold value $T_0$. Reference numeral 202 denotes a binarization selection unit to select either one of the first binarization unit 200 and the second binarization unit 201 in accordance with whether the input data indicates an edge portion of a character or a diagram or not. Binarized data 210 which was selected by the binarization selection unit 202 is transmitted as an image by an image transmission unit 301 or output to an image display unit 302 or an image print unit 303 through an image data output unit 300. The image print unit 303 is constructed by a laser beam printer, an ink jet printer, or the like.

The principle of a binarizing method of the first binarization unit 200 in the embodiment will now be described.

In FIG. 2A, f(i, j) denotes a multivalue density (having a value of 0 to 1) of an input image at the position of an objective pixel to be binarized at present. The pixels at the positions above the broken line have already been binarized. After the pixel f(i, j) now of interest has been binarized, the binarizing process is sequentially executed on f(i+1, j), . . . Similarly, a binarized image B(i, j) (FIG. 2B) denotes a density (having a value of 0 or 1) after the binarization. R(x, y) (FIG. 2C) denotes standardized weighting masks used to obtain an average density. For instance, there is shown an example in the case of referring to thirteen pixels around an objective pixel, including the objective pixel itself. FIG. 3 is a diagram showing an example of numerical values of the weighting masks. According to the system, in a manner similar to the average density approximating method, average densities $m_1(i, j)$ and $m_0(i, j)$ of the pixels at positions near the object pixel in the case where the object pixel has been binarized into black or white are obtained by the following equation:

$$m_1(i, j) = \sum_{y=-2}^{0} \sum_{x=-2}^{2} R(x, y) \times B(i + x, j + y) \quad (1)$$

where, B(i, j) = 1, or $$m_0(i, j) = \sum_{y=-2}^{0} \sum_{x=-2}^{2} R(x, y) \times B(i + x, j + y) \quad (2)$$

where, B(i, j) = 0

On the other hand, the object pixel f(i, j) is obtained by using the average values $m_0$ and $m_1$ as follows.

When $f(i, j) + E(i, j) > \frac{1}{2}[m_0(i, j) + m_1(i, j)]$,
= $m_0(i, j) + \frac{1}{2}R(0, 0)$
B(i, j) = 1
$E_1(i + 1, j) = \frac{1}{2}[f(i, j) + E(i, j) - m_1(i, j)]$
$E_2(j, i + 1) = E_1(i + 1, j)$ When $f(i, j) + E(i, j) \leq m_0(i, j) + \frac{1}{2}R(0, 0)$, B(i, j) = 0

$E_1(i+1, j) = \frac{1}{2}[f(i, j) + E(i, j) - m_0(i, j)]$ $E_2(j, i+1) = E_1(i+1, j) \quad (3)$ where, R(0, 0) denotes an average calculation weight for the objective pixel. It is assumed that $E(i, j) = E_1(i, j) + E_2(i, j)$ In the binarization based on the equation (3), the binarization error E(i, j) is equal to the value which is obtained by adding the errors which are generated when two pixels, the pixel f(i−1, j) before and the pixel f(i, j−1) one line before, were binarized. That is, when two pixels are binarized, the pixel f(i, j−1) is approximated to $m_1(i, j-1)$ or $m_0(i, j-1)$ and the pixel f(i−1, j) is approximated to $m_1(i-1, j)$ or $m_0(i-1, j)$, so that errors upon binarization are generated, respectively.

Different from the conventional average density approximation method, according to the binarizing method of the first binarization unit 200 in the embodiment, the halftone reproducibility is extremely improved. On the other hand, according to the binarizing process, since the binarization is executed while correcting the input image data f(i, j) by the binarization error E(i, j), as compared with the conventional error diffusion method, the similar gradation expression of a high grade can be realized by an extremely small calculation amount.

However, according to the present binarization system (hereinafter, referred to as an average density preservation method), as shown in the conventional error diffusion method, extremely noisy notches are generated in resolution information, particularly, resolution information of an edge portion of a character or a diagram. On the other hand, particle-like dots are generated in a background portion of a character. Therefore, the binarizing method of the second binarization unit 201 of the embodiment, that is, the binarization system by the predetermined threshold value $T_0$ is selectively applied to an edge region of the character on the basis of the result of the discrimination by a pattern matching method on a binarization image, which will be explained hereinlater.

FIGS. 4A to 4H show typical examples of peripheral binary image patterns in the case where it is considered that the object pixel is located at a position such, as an edge or the like of a character portion at which the object pixel should be binarized by a predetermined threshold value. In the diagrams. "*" denotes either 0 or 1 may be used. FIGS. 4A to 4D and FIGS. 4E to 4H show back patterns in which 0 and 1 are inverted, respectively.

The above patterns are shown as examples in which they are selected by paying an attention to the following two features.

(1) In many cases, a character or a diagram is a set of patterns of 0 or 1 which are continuous in either one of two directions which cross perpendicularly.

(2) In many cases, the halftone portion is a set of isolated points which were inverted for the peripheral pixel values.

Although the discrimination can be performed at a higher accuracy by further widening the above region, the good results were Obtained in only eight patterns of the above examples as will be explained hereinlater.

The binarization unit of the embodiment will now be described with reference to a detailed block diagram of the binarization unit of FIG. 1B.

Reference numeral 14 denotes an average value calculation unit (ROM). When the binarization data is simultaneously input to an address terminal while keeping the positional relation shown in FIG. 2A for the object pixel by flip-flops 2 to 13 and a binary data two-line delay unit (FIFO) 1 to delay the binarization data by the time of two lines, the average value calculation unit 14 outputs the foregoing average density value $m_0$. If the results of the calculations by the weighting coefficients shown in FIG. 2C have previously been normalized to the input multivalue data levels of eight bits and a conversion table is written into the average value calculation unit 14, the average value $m_0$ can be easily output. On the other hand, by a similar method, a discrimination signal sel used to discriminate whether the input data coincides with either one of the patterns of FIGS. 4A to 4H or not is output by using one bit of an output.

The average value $m_0$ is input to a binarization error calculation unit 15 comprising a comparator 15a and a subtracter 15b. The binarization of the input multivalue data which was corrected by a binarization error, which will be explained hereinlater, is executed and the binarization error value is calculated. The binarized data is input to one input terminal of a multiplexer 16 as binarized data by the first binarization unit 200.

Error values $E_1$ and $E_2$ according to the equation (3) are respectively input to adders 19 and 20 for correction. First, in the adder 20, input multivalue data f is corrected by only the binarization error $E_2$ to thereby obtain a corrected value $f+E_2$. The corrected value $f+E_2$ is delayed by the time of one line. After that, it is corrected by the amount of the error $E_1$ by the adder 19, so that the errors due to the binarization are corrected. The corrected value $f+(E_1+E_2)$ is delayed and held by the time of one clock by a D flip-flop (D F/F) 18 and is input to the binarization error calculation unit 15 and a comparator 17 for binarization of the second binarization unit 210.

The comparator 17 executes the binarizing process by the predetermined threshold value $T_0$ based on the threshold value which has previously been fixed or can be manually varied by the operator. The result of the binarization is input to the other input terminal of the multiplexer 16.

In the multiplexer 16, either one of the input binarized data is selected by the discrimination signal sel which is output from the average value calculation unit 14 and is input to, for instance, recording means and is also input to the binary data two-line delay unit 1 and is used for the subsequent binarization. Further, if the input data is determined to be an edge portion of a character portion, an output of the comparator 17 is selected and the values of $E_1$ and $E_2$ are set to $E_1=E_2=0$ in the binarization error calculation unit 15, thereby stopping the propagation of the errors to the pixels near the objective pixel.

In the color separated color image data, by applying the foregoing binarizing process to a "black" signal, only a "black" character can be more effectively clearly binarized. Further, the patterns are not limited to the patterns shown in FIGS. 4A to 4H, the correction can be more accurately executed by widening a reference region.

On the other hand, in the average value calculation in the first binarization unit 200, even if the weight $R(0, 0)$ of the object pixel is set to zero, the result of the processing which is sufficiently superior to those by the conventional error diffusion method and average density approximation method is obtained. Therefore, no problem occurs even when $R(0, 0)=0$.

Other embodiments used to discriminate the edge portion of a character will now be described with reference to FIGS. 5A to 5E.

FIG. 5A shows binary data of twelve pixels. By comparing the binary data of the adjacent pixels which cross perpendicularly in accordance with the pixels, "1" is given to the same logic and the addition is executed. The values of the coefficients "0" to "4" indicative of the orthogonal property are assigned. For instance, in the case of the pixel of a, if the logics of a and f are the same and the logics of a and b are different, "1" is assigned to a. If the logics of a, f, and b are the same, "2" is assigned to a. Of, if the logics of a and f differ and the logics of a and b differ, "0" is assigned. The sum of the linear coefficients a which were assigned to all of the twelve pixels is obtained. If the sum is equal to or larger than a predetermined value, this region can be also determined to be an edge portion of a character.

The above embodiments are shown in FIGS. 5B and 5C. FIGS. 5D and 5E show examples in the cases where the above embodiments were executed for the examples of two kinds of binary images, respectively. In the case of the example of the binary image shown in FIG. 5B, the sum S of the orthogonal coefficients is equal to 8 (S=8). In the case of the example B of the binary image shown in FIG. 5C, S=18. It will be obviously understood that the pattern in the example of FIG. 5C is close to the edge pattern of the character portion. At this time, if all of the 12 pixels which are referred to are set to "1" or "0", the region is unconditionally determined to be a halftone region without applying the above rule. It will be apparent that the above discrimination can be realized by a look-up table converting process if the discrimination results are previously stored as results Of bits into a ROM in a manner similar to the above embodiment.

As mentioned above, according to the first embodiment, it is possible to provide an image processing apparatus in which notches in the edge portion of a character are eliminated and a pseudo-halftone image of a high quality can be cheaply obtained.

The above first embodiment has been described with respect to the example in which either binarization by a fixed threshold value or binarization by the average density preservation method is selected in accordance with whether input image data exists in an edge portion or not. As a second embodiment, explanation will now be made hereinbelow with respect to an example in which a plurality of average densities are calculated by using two different weighting masks, those plurality of average densities are mixed in accordance with an edge amount, and the mixed value is used as a binarization threshold value.

Second embodiment

The second embodiment of the present invention will now be described in detail hereinbelow with reference to the drawings.

Figure 6:
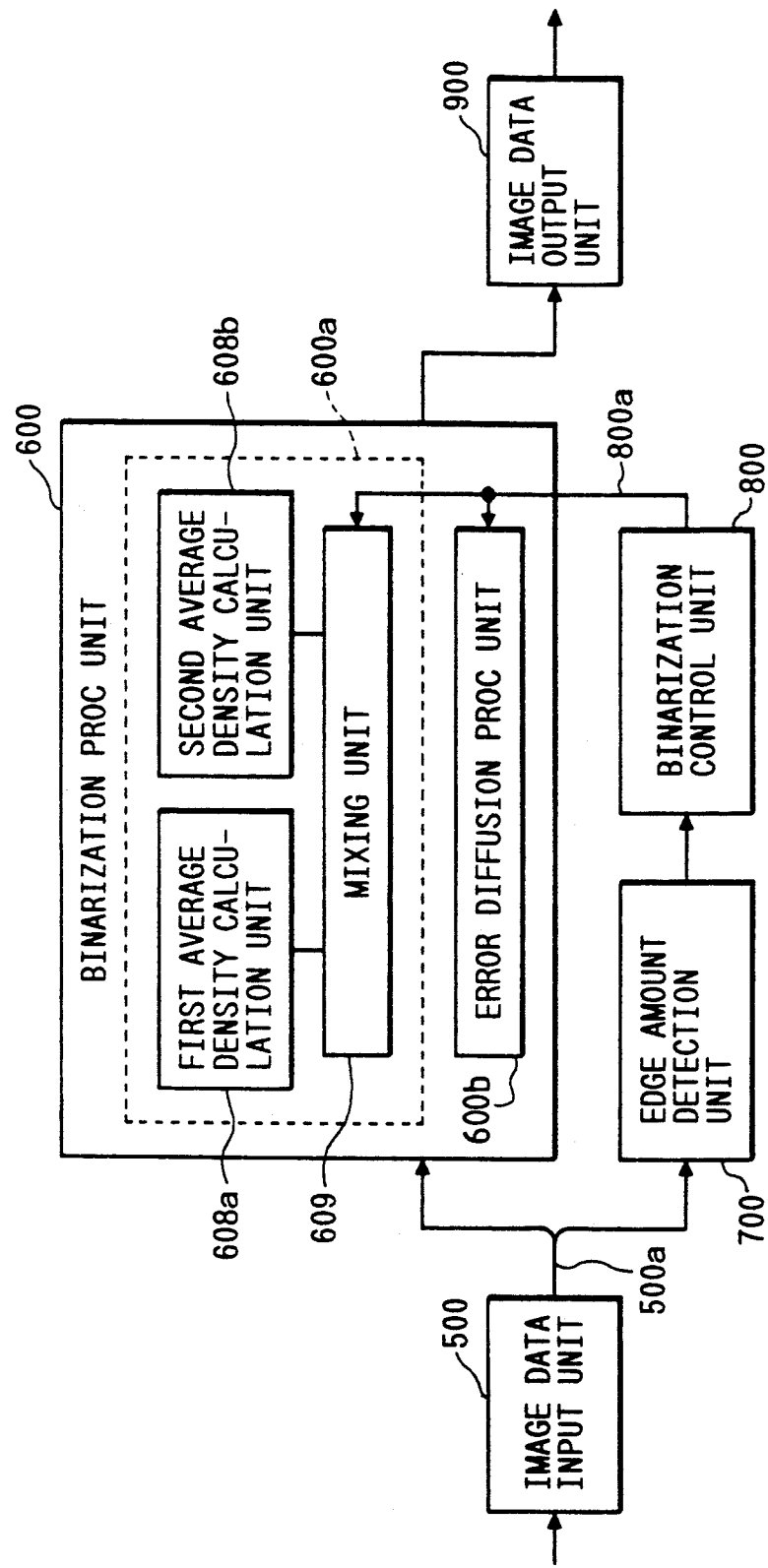
FIG. 6 is a block diagram showing a construction of an image processing apparatus of the second embodiment.

FIG. 6 is a block diagram showing a construction of an image processing apparatus of the embodiment.

Multivalue image data 500a such as image data or the like is read out from, for instance, an original and is input from an image data input unit 500. The multivalue image data 500a is binarized by a binarization processing unit 600 as a pseudo half tone process. The binarized data is output as a display screen, a printed image, or the like through an image data output unit 900. As will be explained in detail hereinbelow, the binarization processing unit 600 executes a process in which an average density calculation processing unit 600a to execute the process based on the average density approximation method and an error diffusion processing unit 600b to execute the error correcting process are integrated. In the second embodiment, such a processing method is called an average density preservation method hereinbelow.

The average density calculation processing unit 600a comprises: a first average density calculation unit 608a to calculate an average density by a first weighting mask; a second average density calculation unit 608b to calculate an average density by a second weighting mask different from the first weighting mask; and a mixing unit 609 for mixing the two calculated average densities and forming an average density for the binarizing process.

On the other hand, the input multivalue data 500a is also input to an edge amount detection unit 700. The mixing process of the mixing unit 609 in the average density calculation processing unit 600a constructing the binarization processing unit 600 is controlled by a control signal 800a from a binarization control unit 800 corresponding to the detected edge amount, thereby rationalizing the binarization in the edge portion. Thus, particularly, a halftone character can be clearly binarized.

The principle of the average density preservation method will now be described with reference to FIGS. 7A to 7C.

The present system relates to a method whereby a weighting average value m(i, j) is obtained by a plurality of binary data B(i, j) which are shown in FIG. 7B and are located near the input multivalue data f(i, j) (0 to 255) shown in FIG. 7A to be binarized and have already been binarized and by prepared weighting masks R(x, y) shown in FIG. 7C, the average value m(i, j) is used as a threshold value, the input multivalue data f(i, j) are binarized by the threshold value, the adjacent input multivalue data to be binarized are corrected by the difference value between the average value m(i, j) and the input multivalue data f(i, j) (accurately speaking, the input multivalue data after completion of the correction, which will be explained hereinlater), and the density is preserved.

The equations to obtain the average value m(i, j) and the difference value are shown below.

$$m(i,j) = \sum_{x=-2}^{2} \sum_{y=-2}^{0} R(x,y) \times B(i+x, j+y) \quad (4)$$

When $f(i,j) + E(i,j) > m(i,j)$, $B(i,j) = 1$

When $f(i,j) + E(i,j) \leq m(i,j)$, $B(i,j) = 0$ $$E_1(i, j+1) = \frac{1}{2}[f(i,j) + E(i,j) - m(i,j)] = E_2(i+1, j) \quad (5)$$

where, $E(i,j) = E_1(i,j) + E_2(i,j)$ \quad (6)

The above principle will now be described with respect to a practical example of FIG. 8.

Figure 8:
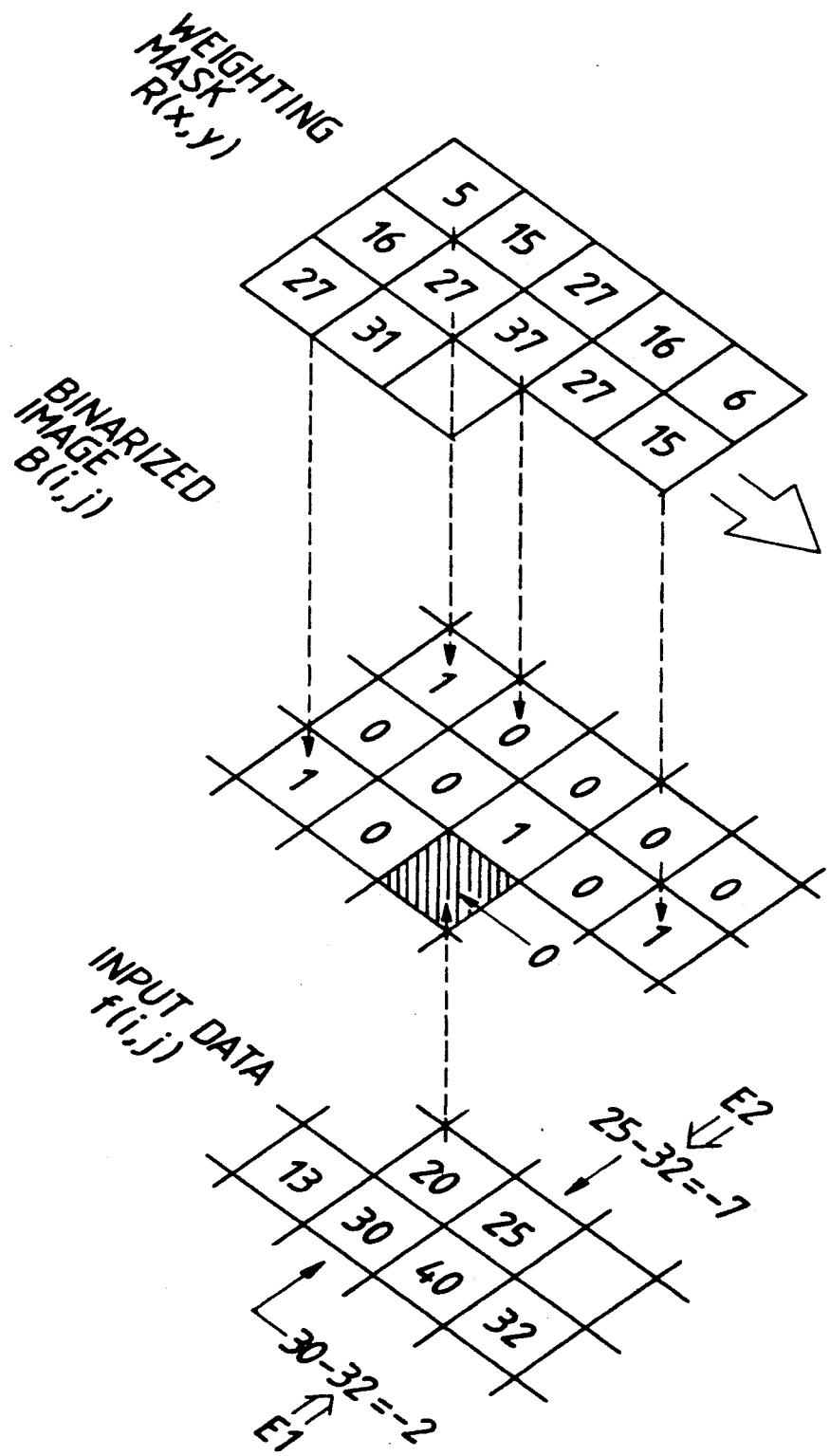

As shown in the upper portion in FIG. 8, the weighting masks are set so that the sum of the values for the twelve pixels near the object pixel is set to 255. Therefore, the average value m(i, j) can be directly used for binarization as a threshold value of a value between 0 to 255. Now, when the binary data B(i, j) shown in the middle portion in FIG. 8 is used, the threshold value to binarize the multivalue data "20" existing at the position of the object pixel, that is, m(i, j) becomes as follows.

$$\begin{aligned} m(i,j) &= (37 \times 0 + 27 \times 1) + \\ &\quad (16 \times 0 + 27 \times 0 + 37 \times 1 + 27 \times 0 + 15 \times 1) + \\ &\quad (6 \times 0 + 16 \times 0 + 27 \times 0 + 15 \times 0 + 5 \times 1) \\ &= 84 \end{aligned}$$

Therefore, B(i, j) is binarized to "0" (since 20<84) and an error which is generated is $20-84=-64$, namely, $E_1(i, j+1)=E_2(i+1, j)=-32$. Due to the above error diffusion, f(i+1, j) is corrected from 25 to $25-32=-7$ and f(i, j+1) is corrected from 30 to $30-32=-2$, respectively.

In the embodiment, in addition to the above fundamental process, in order to solve a drawback such that a thin character is unclearly binarized, ① two kinds of average values $m_A(i, j)$ and $m_B(i, j)$ are obtained by using two different kinds of weighting masks $R_A(x, y)$ and $R_B(x, y)$, ② an edge amount $l_p$ indicative of an edge portion is obtained from the original density data, ③ the average values $m_A(i, j)$ and $m_B(i, j)$ are mixed at a predetermined ratio in accordance with the edge amount, a binarization threshold value m(i, j) is obtained, and the binarization is executed on the basis of the threshold value.

As what is called a one-dimensional Laplacian (constant $\alpha=1$), the edge amount $l_p$ is obtained by $$l_p = |2\alpha \times f(i,j) - \alpha\{f(i-1,j) + f(i+1,j)\}| \quad (7)$$

(where, $l_p=K$ when $l_p>K$)

As a weighting mask which is used, $R_A(x, y)$ is set as shown in FIG. 8 and $R_B(x, y)$ is set as shown in FIG. 9, that is, twelve weights are set to be almost equal. The average value $m_B(i, j)$ in which the background level is more reflected is obtained at the position near the character portion in the original by $R_B(x, y)$. Therefore, at a position near the edge of the character portion in a blank region, since the value of $m_B(i, j)$ is smaller (near white) than that of $m_A(i, j)$, the character portion is emphasized and the clear binarization can be performed.

Therefore, the mixing process of two kinds of average values $m_A$ and $m_B$ which are obtained by using the two kinds of weighting masks is controlled in a manner such as to approach ms as the edge amount $l_p$ is large and to approach $m_B$ as the $l_p$ is small.

In the embodiment, the average density $m(i, j)$ which is mixed and used as a binarization threshold value is $$m(i, j) = \left(1 - \frac{l_p}{K}\right) \times m_A(i, j) + \frac{l_p}{K} \times m_B(i, j) \qquad (8)$$

As the constant $\alpha$ which is used in the embodiment is large, the edge detecting sensitivity is improved. As a constant K is large, a fine intermediate value is obtained from $m_A$ and $m_B$. In the following practical examples, $\alpha = 1$ and $K = 128$.

Figure 10B:
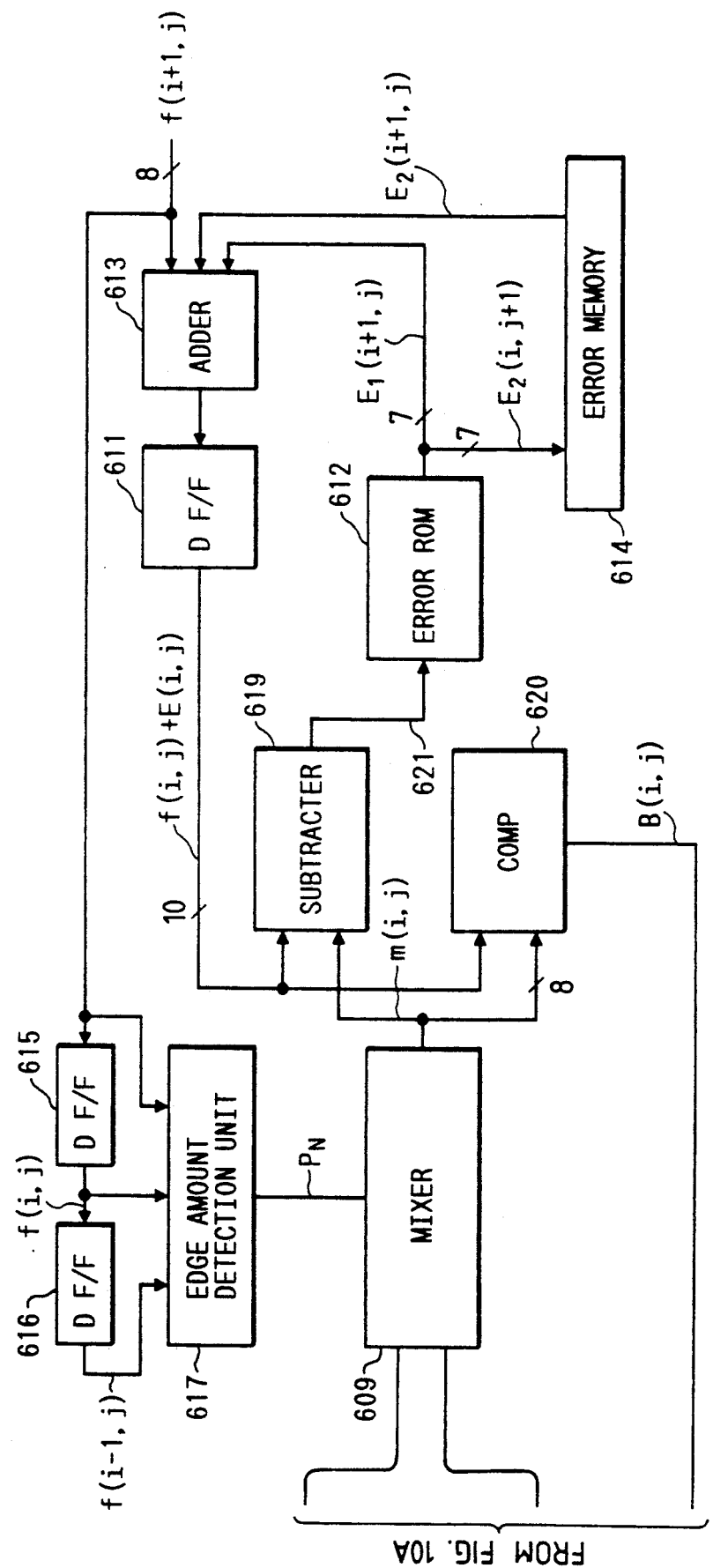

An example of a hardware construction of the binarization processing section in the embodiment will now be described in detail with reference to FIG. 10.

First, the binary data which was binarized by a comparator 620 is input to a D type flip-flop (hereinafter, referred to as a D F/F) 603$i$ and a line memory 602. By sequentially shifting the binary data to ten D F/F 603$a$ to 603$j$ and a line memory 601, twelve binary data corresponding to the weights of the weighting mask regions shown in FIGS. 8 and 9 can be simultaneously output from the output terminals.

The average density calculation units 608$a$ and 608$b$ which receive the twelve outputs comprise ROMs in which the average density values $m_A$ and $m_B$ are previously calculated by using the weights shown in FIGS. 8 and 9 in accordance with the equation (4) and stored. The $m_A(i, j)$ and $m_B(i, j)$ can be obtained at a high speed by the look-up table converting method. The two kinds of average values $m_A$ and $m_B$ are input to the mixing unit 609, respectively.

On the other hand, an edge amount detection unit 617 delays and holds the input data by using D F/F 616 and 615 and calculates the edge amount $l_p$ in accordance with the equation (7) and is a processing unit which is mainly constructed by an adder. An output of the edge amount detection unit 617, that is, the edge amount $l_p$ is input to the mixing unit 609. The calculation according to the equation (8) is executed in the mixing unit 609. An output of the mixing unit 609, namely, the average density value $m(i, j)$ as a binarization threshold value is input to the comparator 620 and a subtracter 619 for error calculation and the binarization and the error value calculation are executed.

An error with a polarity which is output from the subtracter 619 is input to an error ROM 612. In the ROM 612, the error data is divided into two parts in accordance with the equation (5). $E_1(i, j+1)$ is input to an error memory 614 and is delayed and held until the binarization of the next line. Together with $E_2(i+1, j)$ which has already been delayed by the time of one line and held and outputted by the error memory 614, $E_1(i+1, j)$ corrects the input data $f(i+1, j)$ by an adder 613. The timing of the corrected input multivalue data is matched by a D F/F 611 and, thereafter, the input multivalue data is input to the subtracter 619 and comparator 620 and the binarization of the next pixel is executed.

The above processing operation is executed every pixel of the input multivalue data synchronously with a data clock (not shown) which is input to each D F/F.

The first weighting mask $R_A$ to preferably binarize the halftone portion and the second weighting mask $R_B$ to preferably binarize the edge portion, that is, to emphasize and clearly binarize the edge portion are not limited to those in the embodiment but a number of weighting masks can be also considered in accordance with the weight distribution, weighting region, and the like. Particularly, if the weighting mask $R_B(x, y)$ which is characteristically used in the invention is constructed in a manner such that the weight is increased as the pixel is away from the object pixel position or the weight at the position near the object pixel is set to "0", it is more effective. Examples of such weighting masks are shown in FIGS. 11A and 11B.

As other embodiments to mix two kinds of average values in accordance with the amount of Laplacian $l_p$, the value of $l_p$ is processed on the basis of a threshold value and $$\text{when } l_p > \beta, \; m(i, j) = m_B(i, j) \qquad (9)$$
$$\text{when } l_p \leq \beta, \; m(i, j) = m_A(i, j)$$

and two kinds of average values can be also switched.

In the embodiment, there is an advantage such that a hardware of the mixing unit 609 is simplified.

Further, although the average values by the two kinds of weighting masks have been mixed in the embodiment, it is also possible to switch three kinds of weighting masks in accordance with the value of $l_p$ by also using a weighting mask $R_C(x, y)$ which is located as an intermediate mask between the two kinds of weighting masks in the above embodiment. On the other hand, if $m(i, j)$ is obtained by mixing three kinds of weighting masks in an analog manner, it is more advantageous because the processes can be more smoothly made continuous.

In the embodiment, although $l_p$ has been obtained by executing the one-dimensional Laplacian calculation, if it is two-dimensionally obtained, two-dimensional line segments, that is, line segments in both directions which perpendicularly cross can be more clearly binarized. Further, all of the well-known masks for what is called an edge detection can be applied. It will be obviously understood that the equation (8) can be executed in accordance with the operation (particularly, the area designation, mode selection, or the like) of the operator without using the edge amount which is obtained from an image.

Although the above embodiment has been described with respect to the single-color process, for instance, if the invention is applied to the case of processing four colors which were separated into R, G, B, and Bk, particularly, to black Bk, a binarized image in which only a black character was emphasized is obtained. On the other hand, in the case of applying the embodiment every color, it is desirable that edge amount detecting sensitivities $\alpha$ of the other colors than Bk are larger than that of Bk and that, on the contrary, constants K of the other colors than Bk are smaller than that of Bk.

As described above, according to the invention, it is possible to provide an image processing apparatus in which the pseudo-halftone process is cheaply executed at a high grade and the binarization reproduction is realized and a half tone and characters can be clearly binarized.

That is, as compared with the error diffusion method, a calculation amount is small and a high picture quality can be realized and a character portion or the like can be adaptively clearly binarized.

The present invention is not limited to the foregoing embodiments but many modifications and variations are possible within the spirit and scope of the appended claims of the invention.

What is claimed is:

1. An image processing apparatus comprising:

input means for inputting multi-level data of an object pixel which is an object o binarization processing;

calculating means for producing weighted binary data by performing predetermined weighting on binary data of plural pixels near the object pixel, the binarization processing of the plural pixels having been completed, and for calculating an average value using the weighted binary data;

first binarizing means for binarizing the multi-level data of the object pixel, using the average value calculated by said calculating means as a threshold value;

second binarizing means for binarizing the input multi-level data of the object pixel, using a predetermined threshold value;

detecting means for detecting whether or not the data of the object pixel exist in ann edge portion, on the basis of the binary data of the plural pixels on which the binarization processing has been completed; and selecting means for selecting either one of said first and second binarizing means in accordance with a detection result of said detecting means.

2. An apparatus according to claim 1, wherein said first binarizing means has error diffusing means for diffusing binarization errors.

3. An apparatus according to claim 1, wherein said average value and a selection signal of said selecting means are stored in memory means by using the binary data of the pixels near the object pixel as addresses.

* * * * *

UNITED STATES PATENT AND TRADEMARK OFFICE
CERTIFICATE OF CORRECTION

PATENT NO. : 5,153,925
DATED : October 6, 1992
INVENTOR(S) : HIROSHI TANIOKA, ET AL.

It is certified that error appears in the above-identified patent and that said Letters Patent is hereby corrected as shown below:

TITLE PAGE

IN [57] ABSTRACT

Line 14, "half tone" should read --halftone--.

COLUMN 1

Line 32, "without involving" should read --method involves--.
Line 41, "reproduced" should read --be reproduced--.
Line 47, "writing" should read --correction for--.
Line 53, "of were" should read --of which were--.

COLUMN 2

Line 5, "eliminated the" should read --eliminated, the--.

COLUMN 5

Line 6, "an" should be deleted.
Line 16, "Obtained" should read --obtained--.
Line 36, "either one" should read --any--.

COLUMN 6

Line 35, "Of," should read --Or,--.
Line 37, "a" should be deleted.
Line 47, "of the example B" should be deleted.

COLUMN 7

Line 19, "pseudo half tone" should read --pseudo-halftone--.

UNITED STATES PATENT AND TRADEMARK OFFICE
CERTIFICATE OF CORRECTION

PATENT NO. : 5,153,925
DATED : October 6, 1992
INVENTOR(S) : HIROSHI TANIOKA, ET AL.

It is certified that error appears in the above-identified patent and that said Letters Patent is hereby corrected as shown below:

COLUMN 9

Line 4, "ms" shoudl read --$m_B$--.
Line 5, "$m_B$" should read --$m_A$--.

COLUMN 10

Line 45, "equation ⑧" should read --equation ⑨--.
Line 56, "embodiment" should read --embodiment to--.
Line 65, "half tone" should read --halftone--.

COLUMN 11

Line 11, "o" should read --of--.

COLUMN 12

Line 7, "ann" should read --an--.

Signed and Sealed this

Fourteenth Day of December, 1993

*Attest:*

BRUCE LEHMAN

*Attesting Officer*     *Commissioner of Patents and Trademarks*